[11] 3,621,340

[72] Inventors Shobha Singh
Summit;
LeGrand G. Van Uitert, Morris Township,
both of N.J.
[21] Appl. No. 816,764
[22] Filed Apr. 16, 1969
[45] Patented Nov. 16, 1971
[73] Assignee Bell Telephone Laboratories Incorporated
Murray Hill, N.J.

[54] GALLIUM ARSENIDE DIODE WITH UP-CONVERTING PHOSPHOR COATING

9 Claims, 2 Drawing Figs.

[52] U.S. Cl. .... 313/108D, 307/88.3, 331/94.5, 252/301.4
[51] Int. Cl. .... H01j 1/62, H01j 63/04, H01s 3/00
[50] Field of Search .... 313/108 D; 252/301.4; 307/88.3

[56] References Cited
UNITED STATES PATENTS

| | | | |
|---|---|---|---|
| 3,278,814 | 10/1966 | Rutz | 313/108 D x |
| 3,387,163 | 6/1968 | Queisser | 313/108 D |
| 3,405,371 | 10/1968 | Joynson et al. | 252/301.4 x |
| 3,437,432 | 4/1969 | Borchardt | 252/301.4 x |

*Primary Examiner*—Robert Segal
*Attorneys*—R. J. Guenther and Edwin B. Cave

ABSTRACT: Adjustable color in the visible spectrum results from use of a gallium arsenide infrared emitting diode provided with a coating of a composition having at least one each of two different anions in some unit cells. The composition exemplified by a variety of oxyhalides contain the cation pair $Yb^{3+}$–$Er^{3+}$, $Yb^{3+}$–$Ho^{3+}$ and mixtures thereof.

3621340
OR IN 313/501

INVENTORS
S. SINGH
L. G. VAN UITERT
BY George S. Indig
ATTORNEY

GALLIUM ARSENIDE DIODE WITH UP-CONVERTING PHOSPHOR COATING

BACKGROUND OF THE INVENTION

1. Field of the Invention

The invention is concerned with electroluminescent devices having outputs at visible wavelengths and with phosphors used in such devices. Contemplated use is in display devices on communication and computer equipment.

2. Description of the Prior Art

A variety of low power level, electroluminescent devices have been described. A common class utilizes a forward-biased PN junction semiconductor diode.

The best publicized PN junction electroluminescent devices utilize gallium phosphide. Depending on which of the popular dopants, oxygen or nitrogen, is used, these diodes may emit at red or green wavelengths.

A recently announced class of devices depends on the use of an up-converting phosphor coating on a gallium arsenide junction diode. This was recently described in an article by S. V. Galginaitis, et al. International Conference on GaAs, Dallas, Oct. 17, 1968, "Spontaneous Emission Paper No. 2." The device depends on a phosphor coating which depends upon the presence of ytterbium acting as a sensitizer and erbium acting as an activator. Conversion from the infrared output of the GaAs junction to a green wavelength is brought about by a sequential (or second photon) process.

GaP devices containing both types of doping may simultaneously emit at green and red wavelengths. Since the red emission eventually saturates with increasing power while the green does not, the possibility of varying apparent color output by varying input power is implicit. Since, however, red emission is also significantly more efficient, the likelihood of producing a dominant green output is small. Little if any attention has been directed to such an adjustable color GaP device in the literature.

Coated GaAs devices described in the literature have invariably operated with output in the green.

SUMMARY OF THE INVENTION

GaAs infrared diodes are provided with phosphor coatings of a class of compositions, including compounds, in which at least two available anion sites in some unit cells are differently populated and which manifest adjustable visible color output. Compounds are exemplified by various oxyhalide stoichiometries in which the halide to oxygen ratio equals or exceeds unity. As in known coated GaAs diodes, up conversion results from inclusion of trivalent ytterbium which serves as a sensitizer. This sensitizer ion is invariably paired with an activator which may be trivalent erbium or trivalent holmium. Under certain circumstances, advantages such as color adjustability and color equalization may result from physically mixed compounds containing different activators.

The unmodified oxychloride compound having a 1:1 chlorine to oxygen ratio and containing the single pair, $Yb^{3+}$–$Er^{3+}$, is not a preferred composition for these purposes, since output is predominantly red under usual input conditions. However, modifications may result in enhancement of color adjustability. One such modification takes the form of a simple increase in the chlorine to oxygen ratio, another takes the form of dilution of the 1:1 compound with a diluent such as PbFCl or $NaYF_2Cl_2$, a third includes a mixture of or and Ho activators in the same composition and a fourth includes a mixture of compounds, one of which at least may contain Ho. Preferred embodiments of the invention are so described.

Certain of the phosphor compositions herein are novel and so represent additional embodiments of the invention.

DETAILED DESCRIPTION

1. Drawing

Figure 1:
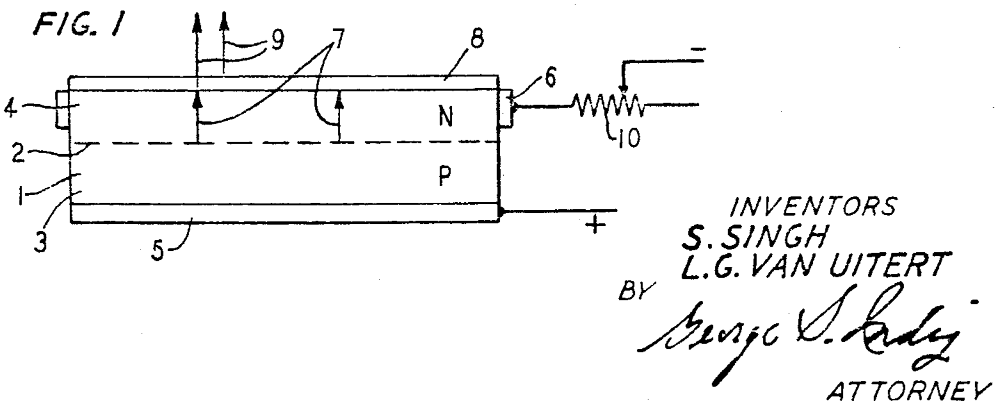
FIG. 1 is a front elevational view of an infrared emitting diode having a phosphor converting coating in accordance with the invention.

Referring again to FIG. 1, gallium arsenide diode 1 containing PN junction 2, defined by P and N regions 3 and 4, respectively, is forward biased by planar anode 5 and ring cathode 6 connected to power supply not shown. Infrared radiation is produced by junction 2 under forward biased conditions, and some of this radiation, represented by arrows 7, passes into and through layer 8 of a phosphorescent material in accordance with the invention. Under these conditions, some part of radiation 7 is absorbed within layer 8, and a major portion of that absorbed participates in a two-photon or higher order photon process to produce radiation at a visible wavelength/s. The portion of this reradiation which escapes is represented by arrows 9.

Potentiometer 10, in series with diode 1, serves the function of permitting adjustment of input power to the diode thereby varying the infrared emission and, in consequence, altering the apparent color output of emission 9 in accordance with the invention. This element is intended to be illustrative of variable power input means which may be operated to adjust or alter apparent output frequency on occasion, in a continuous fashion or in any other desired manner.

Figure 2:
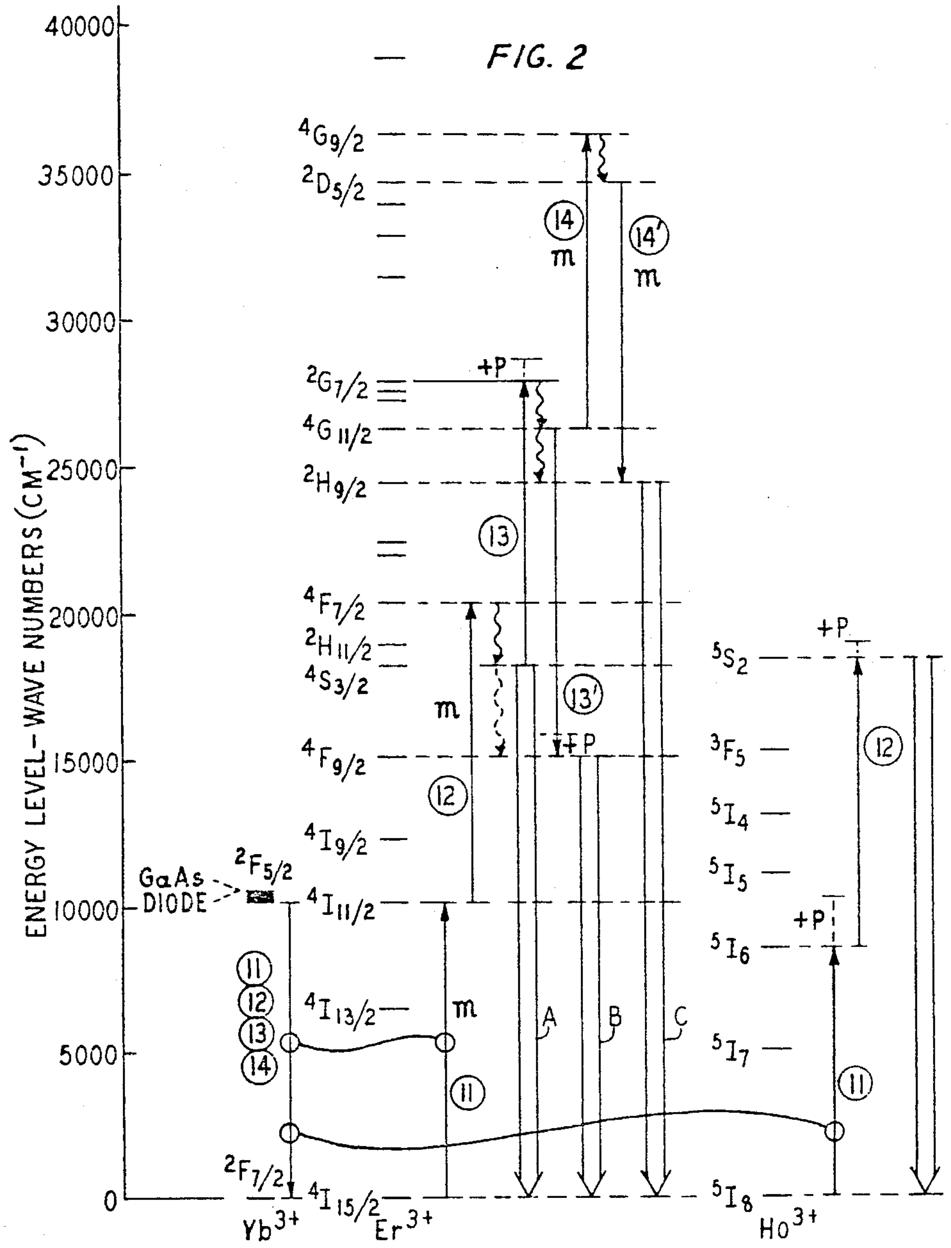
FIG. 2 is an energy level diagram in ordinate units of wave numbers for the ions $Yb^{3+}$, $Er^{3+}$ and $Ho^{3+}$ within the crystallographic environment provided by a composition herein.

The main advantage of the defined phosphors is best described in terms of the energy level diagram of FIG. 2. While this energy level diagram is a valuable aid in the description of the invention, two reservations must be made. The specific level values, while reasonably illustrative of those for the various included compositions of the noted type, are most closely representative of the oxychloride systems either of the YOCl or $Y_3OCl_7$ stoichiometries. Also, while the detailed energy level description was determined on the basis of carefully conducted absorption and emission studies, some of the information contained in the figure represents only one tentative conclusion. In particular, the excitation routes for the 3 and 4 photon processes are not certain although it is clear that certain of the observed emission represents a multiple photon process in excess of doubling. The diagram is sufficient for its purpose; that is, it does describe the common advantage of the included host materials and, more generally, of the included phosphors in the terminology which is in use by quantum physicists.

FIG. 2 contains information on $Yb^{3+}$, $Er^{3+}$ and $Ho^{3+}$. The ordinate units are in wavelengths per centimeter ($cm.^{-1}$). These units may be converted to wavelengths in angstrom units (A) or microns ($\mu$) in accordance with the relationship:

$$\text{Wavelength}=\frac{10^8}{\text{Wave numbers}}\text{Å}.=\frac{10^4}{\text{Wave numbers}}\mu.$$

The left-hand portion of the diagram is concerned with the relevant manifolds of $Yb^{3+}$ in a host of the invention. Absorption in $Yb^{3+}$ results in an energy increase from the ground manifold $Yb^2F_{7/2}$ to the $Yb^2F_{5/2}$ manifold. This absorption defines a band which includes levels at 10,200 $cm.^{-1}$, 10,500 $cm.^{-1}$ and 10,700 $cm.^{-1}$. The positions of these levels are affected by the crystal field splitting within the structures having at least one each of two different anions or at least one anion vacancy per unit cell or formula unit. In the oxychlorides, for example, they include a broad absorption which peaks at about 0.935$\mu$ (10,700 $cm.^{-1}$), there is an efficient transfer of energy from a silicon-doped GaAs diode (with its emission peak at about 0.93$\mu$). This contrast with the comparatively small splitting and weaker absorption at 0.93$\mu$ in lanthanum fluoride and other less anisotropic hosts in which absorption peaking is at about 0.98 $\mu$ for $Yb^{3+}$.

The remainder of FIG. 2 is discussed in conjunction with the postulated excitation mechanism. All energy level values and all relaxations indicated on the figure have been experimentally verified.

2. Postulated Excitation Mechanisms

Following absorption by $Yb^{3+}$, of emission from the GaAs diode, a quantum is yielded to the emitting ion $Er^{3+}$ (or as also discussed in conjunction with the figure, to $Ho^{3+}$). The first transition is denoted 11. Excitation of $Er^{3+}$ to the $^4I_{11/2}$ is almost exactly matched in energy (denoted by *m*) to the relaxation transition of $Yb^{3+}$. However, a similar transfer, resulting in excitation of $Ho^{3+}$ to $Ho^5I_6$, requires a simultaneous release of one or more phonons (+P). The manifold $Er^4I_{11/2}$ has a substantial lifetime, and transfer of a second quantum from $Yb^{3+}$ promotes transition 12 to the $Er^4F_{7/2}$ manifold. Transfer of a second quantum to $Ho^{3+}$ results in excitation to $Ho^5S_2$ with simultaneous generation of a phonon. Internal relaxation is represented on this figure by the wavy arrow ( ↓ ). In erbium, the second photon level ($Er^5F_{7/2}$) has a lifetime which is very short due to the presence of close, lower lying levels which results in rapid degradation to the $Er^4S_{3/2}$ state through the generation of phonons.

The first significant emission of $Er^{3+}$ is from the $Er^4S_{3/2}$ state (18,200 cm.$^{-1}$ or 0.55$\mu$ in the green). This emission is denoted in the figure by the broad (double line) arrow A. The reverse of the second photon excitation, the nonradiative transfer of a quantum from $Er^4F_{7/2}$ back to $Yb^{3+}$ must compete with the rapid phonon relaxation to $Er^4S_{3/2}$ and is not limiting. The phonon relaxation to $Er^2F_{9/2}$ also competes with emission A and contributes to emission from that level. The extent to which this further relaxation is significant is composition dependent. The overall considerations as to the relationship between the predominant emissions and composition are discussed under the heading "Composition."

Green emission A at a wavelength of about 0.55$\mu$ corresponds to that which has been observed for or in $LaF_3$. In accordance with this invention, it has been shown that the structures having mixed anions or anion vacancies with large resulting anisotropic environments about the cations are characterized by large crystal field splitting and improved absorption of GaAs:Si emission by $Yb^{3+}$. Large crystal field anisotropics also result in increased opportunity for internal relaxation mechanisms involving phonon generation which thus far have not been found to be pronounced in comparable but more isotropic media. For $Er^{3+}$, this enhances emission B at red wavelengths. Erbium emission B is, in part, brought about by transfer of a third quantum from $Yb^{3+}$ to or 3+ which excites the ion from $Er^4S_{3/2}$ to $Er^2G_{7/2}$ with simultaneous generation of a phonon (transition 13). This is followed by internal relaxation to $Er^4G_{11/2}$ which, in turn, permits relaxation to $Er^2F_{9/2}$ by transfer of a quantum back to $Yb^{3+}$ with the simultaneous generation of a phonon (transition 13'). The $Er^2F_{9/2}$ level is thereby populated by at least two distinct mechanisms and indeed experimental confirmation arises from the finding that emission B is dependent on a power of the input intensity which is intermediate in character to that characteristic of a three-phonon process and that characteristic of a two-phonon process for the $Y_3OCl_7$ host. Emission B, in the red, is at about 15,250 cm.$^{-1}$ or 0.66$\mu$.

While emissions in the green and red are predominant, there are many other emission wavelengths of which the next strongest designated C is in the blue (24,400 cm.$^{-1}$ or 0.41$\mu$). This third emission designated C originates from the $Er^2H_{9/2}$ level which is, in turn, populated by two mechanisms. In the first of these, energy, is received by a phonon process from $Er^4G_{11/2}$. The other mechanism is a four-photon process in accordance with which a fourth quanta is transferred from $Yb^{3+}$ to $Er^{3+}$ exciting $Er^4G_{9/2}$ from $Er^4G_{11/2}$ (transition 14). This step is followed by internal relaxation to $Er^2D_{5/2}$ from which level energy can be transferred back to Yb relaxing or to $Er^2H_{9/2}$ (transition 14').

Significant emission from holmium occurs only by a two-photon process. Emission is predominantly from $Ho^5S_2$ in the green (18,350 cm.$^{-1}$ or 0.54$\mu$). The responsible mechanisms are clear from FIG. 2 and the foregoing discussion.

3. Material Preparation

Since the phosphors of the invention are in powder or polycrystalline form, growth presents no particular problem. Oxychlorides, for example, may be prepared by dissolving the oxides (rare earth and yttrium oxides) in hydrochloric acid, evaporating to form the hydrated chlorides, dehydrating, usually near 100° C. under vacuum, and treating with $Cl_2$ gas at an elevated temperature (about 900° C.). The resulting product can be the one or more oxychlorides, the trichloride or mixtures of these depending on the dehydrating conditions, vacuum integrity and cooling conditions. The trichloride melts at the elevated temperature and may act as a flux to crystallize the oxychlorides. The YOCl structure is favored by high Y contents, intermediate dehydration rates and slow cooling rates, while more complex chlorides such as $(Y,Yb)_3OCl_7$ are favored by high rare earth content, slow dehydration and fast cooling. The trichloride may subsequently be removed by washing with water. Dehydration should be sufficiently slow (usually 5 minutes or more) to avoid excessive loss of chlorine.

Oxybromides and oxyiodides may be prepared by similar means using hydrobromic acid and gaseous HBr or hydroiodic acid and gaseous HI in place of hydrochloric acid and $Cl_2$ in the process.

Mixed halides such as those containing both alkali metals and rare earths can be prepared by dissolving the oxide in HCl and precipitating with HF, dehydrating and melting the resulting material together near 1,000° C. in vacuum. Lead or alkaline earth fluorochlorides and fluorobromides may be prepared simply by melting the appropriate halides together. In both cases the products can, in turn, be melted together with the oxyhalide phosphors to adjust their properties.

4. Composition a. Matrix

The compositional requirements of the invention have been briefly set forth. Adjustability or tunability depend upon the crystal field conditions which have been observed in a number of compounds wherein the rare earth ion is in an anisotropic environment. Preferably, this anisotropy results by use of a host composition which includes at least one compound having a crystalline structure such that there are at least two available anion sites which are populated differently in at least 1 percent of the unit cells and preferably in at least 5 percent of the unit cells. While this may take the form of a compound in which one such site is occupied while the other is not, the more usual form of the invention includes at least two different anions in such unit cells. Examples of such compounds are: rare earth and yttrium, oxychlorides, oxybromides, oxyiodides, oxychalkogenides, e.g. those and mixtures of oxyhalides with fluorohalides, of the form $M^{1+}M^{3+}X_4$ and alkaline earth or lead fluorohalides of the form $M^{2+}X_2$ where $M^{1+}$ = Li, Na, K, Rb, Cs or Tl; $M^{2+}$ = Ca Sr, Ba or Pb; $M^{3+}$ = Sc, La, Gd, Lu, Bi and X = F, cl. Br, or I. The 1 percent minimum requirement implies the possibility of mixed host compositions and such mixtures may include any number of the foregoing.

The oxychlorides, oxybromides and oxyiodides are preferred; and, of these, the oxychlorides are the most preferred class. These include at least two different stoichiometries which may be designated in accordance with their chlorine to oxygen ion ratios. The simplest stoichiometry exemplified by YOCl has the tetragonal D 7/4h − P4/nmm structure. A different stoichiometry has a hexagonal structure. An exemplary material has a composition with the analyzed metal ratios: Y=56 percent, Yb=43 percent and Er=1 percent, has lattice constants $a_0$=5.607, $c_0$=9.260 and has prominant *d*-spacings of 9.20, 2.33, 3.09, 4.62 and 2.83. Analysis indicates the structure $M_3OCl_7$ where M is one or more of the cations of the rare earths and ytterbium.

For purposes of the discussion of this invention, oxychlorides are discussed in terms of a first class in which the chlorine to oxygen cation content is approximately equal to unity and a second class in which the chlorine to oxygen cation ratio is greater than unity. In accordance with the said second class, a ratio of at least 1.5 is considered to suffice.

Such a minimal cation ratio requires at least the partial presence of an oxychloride phase other than that having a ratio of unity. For the purposes of this invention, such minimal ratio constitutes a preferred embodiment since it is the only preferred compound class containing the single activator $Er^{3+}$ and which as otherwise unmodified may function efficiently as an adjustable visible phosphor.

b. Sensitizer Content

Every composition in accordance with this invention contains the cation pair $Yb^{3+}$–$Er^{3+}$ although, as noted, this may be modified as by addition, dilution or physical admixture. $Yb^{3+}$ is the required sensitizer and it is to this ion that initial energy transfer is first made from the infrared diode or other infrared source. Content of this and other cations is discussed in terms of ion percent based on total cation content of the concerned compound. A minimum $Yb^{3+}$ content is set at 5 percent since appreciably less $Yb^{3+}$ is insufficient to result in reasonable conversion efficiency regardless of $Er^{3+}$ content. A preferred minimum of about 10 percent on the same basis is based on an observed output intensity comparable to that of well engineered gallium phosphide diodes. These minimal applied universally to the total phosphor compositions of the invention.

The maximum recommended $Yb^{3+}$ content is somewhat dependent upon the other nature of the phosphor composition. To some extent, this fact is evident from the detailed description of FIG. 2. Regardless of the nature of the composition, a $Yb^{3+}$ content of 50 percent is permitted in the absence of Ho additions. A content approaching 100 percent is permitted when Ho is present. The 50 percent content is not sufficiently high to mask an otherwise obtainable green emission by employing an adequate $Er^{3+}$ content and the presence of $Ho^{3+}$ assures green emission at low power levels for any $Yb^{3+}$ content. Specific maxima are discussed in terms of two systems.

Oxyhalides containing X:O ratios of at least 1.5

For compositions activated by $Er^{3+}$ alone the maximum $Yb^{3+}$ content is 50 percent of the cations since beyond this level multiphoton processes in excess of two photons become sufficiently efficient under many conditions to limit green emission. A preferred maximum lies at 40 percent since essentially pure green remains attainable from $Er^{3+}$ for the usual range of content of this ion at some GaAs emission output level. However for compounds coactivated by at least 1/50 cation percent $Ho^{3+}$ the upper $Yb^{3+}$ limit approaches 100 percent (allowing only for activator).

Those including oxyhalide in which the X:O anion ratio is approximately 1:1

These compounds emit red when sensitized by $Yb^{3+}$ and activated by $Er^{3+}$ for all sensitizer concentrations. Therefore the upper limit for $Yb^{3+}$ approaches 100 percent but these compositions suit the purpose of this invention only where modified. Modifications may be of any of three types. First, coactivation by adding limited amounts of $Ho^{3+}$; second, dilution with a flurohalide and third by physically mixing particulate but distinct materials. In accordance with the first of these $Ho^{3+}$ is incorporated with $Er^{3+}$ to the nominal extent of 10 percent of the latter. A dominant green emission is furnished by $Ho^{3+}$ at threshold infrared pumping levels from the diode while red emission from or is dominant at high pumping levels.

The second modification takes the form of a dilution of 1:1 oxychloride, for example, by PbFCl or $NaYF_2Cl_2$ (where the compound is an oxybromide, it is expedient to dilute with $NaYF_2Br_2$ or PbFBr). Referring to the cation content of the mixed $Yb^{3+}$–$Er^{3+}$-containing compound, $Yb^{3+}$ may be permitted to approach 80 percent beyond which the quality of the green obtainable is insufficient for most purposes due to red contamination. A preferred maximum lies at about 60 percent since substantial green purity is obtainable for feasible dilution ranges e.g. 40–90 mol percent PbFCl or equivalent).

In the third modification green emission is furnished by $Ho^{3+}$ which is contained together with $Yb^{3+}$ within a crystal which may or may not contain $Er^{3+}$ and red emission is furnished by $Er^{3+}$ contained together with $Yb^{3+}$ in a similar matrix which does not contain an excessive amount of $Ho^{3+}$. In general, the $Ho^{3+}$ content is about 10 percent of the $Er^{3+}$ content or more for the first component and is less than 10 percent and preferably less than 3 percent of the $Er^{3+}$ content for the second. Since $Ho^{3+}$ emits predominately in the green in every case and $Er^{3+}$ emits predominantly in the red in these 1:1 oxyhalides the relative of the components may be chosen solely on the basis of the green purity which is required. Obviously the green-emitting component can be an $Er^{3+}$ activated material that fluoresces green such as $Y_{0.99}Yb_{0.2}Er_{0.01}F_3$, $NaY_{0.79}Yb_{0.20.01}F_2Cl_2$ or $Na_{0.5}Yb_{0.49}Er_{0.01}WO_4$. The content of sensitizer ($Yb^{3+}$) in a given component may rise to levels of 99+ percent. A physical mixture of this nature is considered useful for these purposes where there is at least 5 mol percent of the dominantly green fluorescing compound.

c. Activator Content $Er^{3+}$ content is selected to maximize brightness for this is the principal activator present, although other considerations dictate limits. Generally, the erbium content is from about 1/16 to about 20 percent. Below this minimum, brightness is not appreciable. Above the maximum, radiationless processes substantially quench output. A preferred range is from about ¼ to about 2 percent. The minimum is dictated by the subjective criterion that only at this level does a coated diode with sufficient brightness for observation in a normally lighted room result. The upper limit results from the observation that further increase does not substantially increase output.

Holmium, recommended as an adjunct to erbium in conjunction with ytterbium, may be included in an amount from about 1/50 to about 5 percent to enhance the green output of erbium. A similar result may be obtained by using mechanical mixtures of, for example, $Yb^{3+}$–$Er^{3+}$ compound and a $Yb^{3+}$–$Ho^{3+}$ compound. The same limits apply to such admixtures with all limits in ion percent of *total cations* in the phosphor as above.

Where the required cation content of the host is not met by the total Yb+Er+Ho, "diluent" cations may be included to make up the deficiency. Such cations desirably have no absorption levels below any of the levels relevant to the described multiphoton processes. A cation which has been found suitable is yttrium. Others including $Pb^{2+}$, $Gd^{3+}$ and $Lu^{3+}$ have been set forth above.

Other requirements are common to phosphor materials in general. Various impurities which may produce unwanted absorption or which may otherwise "poison" the inventive systems are to be avoided. As a general premise, maintaining the compositions at a purity level resulting from use of starting ingredients which are three nines pure (99.9 percent) is adequate. Further improvement, however, results from further increase in purity at least to five nines level. For long term use many of the included compositions are desirably protected from certain environmental constituents. Glass, plastic, and other common incapsulants are suitably used for such purpose.

The following examples are directed to a combination of a silicon-doped GaAs diode with a phosphor or a combination of phosphors that appear to emit visible light that can be varied in color by changing the intensity of emission from the diode. The diode employed had a 25-mil junction and a 72-mil dome. For 1.5 volts applied as a forward bias with a resulting 2 amperes passing through the diode the output of the diode was 0.2 watts at $0.93\mu$. In each case the phosphor or combination of phosphors was applied directly to the diode dome as a $\approx 2$ mil thick film using collodion as a binder. A constant voltage supply set for one volt was used to supply current to the diode. The principal emissions affecting the eye are red (at $0.66\mu$) and green (in the $0.54$–$0.55\mu$ region). As the former is the product of a three-photon process that drains the levels responsible for green emission in or and the latter is a two-photon process for both or and Ho, the relative intensity of emission in the red increases rapidly with increasing diode emission (or increasing current through the diode). To the eye, the apparent hue of the overall emission can thereby be varied from blue green through red including the intermediate shades.

EXAMPLE 1

Using a phosphor $(Yb_{0.29}Er_{0.01}Y_{0.70})_3OCl_7$ the apparent emission was green below 0.1 ampere, red above 0.5 ampere and changed in hue through yellowish white in between.

EXAMPLE 2

Using the phosphor $(Yb_{0.29}Er_{0.01}Ho_{0.0005}Y_{0.6995})_3OCl_7$ the apparent emission was green below 0.2 ampere, red above 0.6 ampere and changed in hue in between.

EXAMPLE 3

Using a phosphor constituted as one-third $Yb_{0.99}Er_{0.01}OCl$ by weight and two-thirds $PbFCl$ by weight, a deep green emission was observed below 0.3 ampere, red above 1.0 ampere and changing hues through yellow-white in between.

EXAMPLE 4

Using a phosphor constituted as one-half $Yb_{0.99}Er_{0.01}OCl$ by weight and one-half $LiYF_2Cl_2$ by weight, a green emission was observed below 0.3 ampere, red above 1.0 ampere and changing hues through yellow white in between.

EXAMPLE 5

Using a mechanical mixture of $(Yb_{0.3}Er_{0.01}Y_{0.69})_3OCl_7$ and $(Yb_{0.3}Ho_{0.005 0.695})OCl$ in a 2-to-1 weight ratio, the output appeared green below 0.2 ampere, red above 0.8 ampere and changed in hue through yellow white in between.

The compositions listed below constitute additional examples of materials colorable under conditions similar to those of examples 1 through 5

$(Y_{0.7}Yb_{0.29}Er_{0.01})_3OCl_7$
$(Y_{0.7}Yb_{0.29}Er_{0.01})_3OCl_6Br$
$(Y_{0.7}Yb_{0.29}Er_{0.01})_3OCl_6I$
$(Y_{0.7}Yb_{0.29}Er_{0.01})_3OCl_6F$
$(Gd_{0.7}Yb_{0.29}Er_{0.01})_3OCl_7$
$(La_{0.7}Yb_{0.29}Er_{0.01})_3OCl_7$
$(Lu_{0.7}Yb_{0.29}Er_{0.01})_3OCl_7$
$(Y_{0.7}Yb_{0.2895}Er_{0.01}Ho_{0.0005})_3OCl_7$
$Yb_{0.975}Er_{0.02}Ho_{0.005}OCl$
$Yb_{0.975}Er_{0.02}Ho_{0.005}OBr$
$Yb_{0.975}Er_{0.02}Ho_{0.005}OI$
$Y_{0.5}Yb_{0.475}Er_{0.02}Ho_{0.005}OCl$
$Y_{0.5}Yb_{0.475}Er_{0.02}Ho_{0.005}OBr$
$Y_{0.5}Yb_{0.475}Er_{0.02}Ho_{0.005}OI$
½ $Yb_{0.98}Er_{0.02}OCl$·½ $PbFCl$
½ $Yb_{0.98}Er_{0.02}OBr$·½ $PbFBr$
½ $Yb_{0.98}Er_{0.02}OCl$·½ $PbFBr$
½ $Yb_{0.98}Er_{0.02}OI$·½ $PbFI$
½ $Yb_{0.98}Er_{0.02}OCl$·½ $BaFCl$
½ $Yb_{0.98}Er_{0.02}OCl$·½ $SrFCl$
½ $Yb_{0.98}Er_{0.02}OCl$·½ $CaFCl$
½ $Yb_{0.98}Er_{0.02}OBr$·½ $BaFBr$
½ $Yb_{0.98}Er_{0.02}OI$·½ $BaFI$
½ $Yb_{0.98}Er_{0.02}OCl$·½ $LiYF_4$
½ $Yb_{0.98}Er_{0.02}OCl$·½ $LiYF_2Cl_2$
½ $Yb_{0.98}Er_{0.02}OCl$·½ $NaYF_2Cl_2$
½ $Yb_{0.98}Er_{0.02}OCl$·½ $KYF_2Cl_2$
½ $Yb_{0.98}Er_{0.02}OCl$·½ $RbYF_2Cl_2$
½ $Yb_{0.98}Er_{0.02}OCl$·½ $CsYF_2Cl_2$
½ $Yb_{0.98}Er_{0.02}OCl$·½ $LiLaF_4$
½ $Yb_{0.98}Er_{0.02}OCl$·½ $LiLaF_2Cl_2$
½ $Yb_{0.98}Er_{0.02}OC$·½ $NaLaF_2Cl_2$
½ $Yb_{0.98}Er_{0.02}OCl$·½ $KLaF_2Cl_2$
½ $Yb_{0.98}Er_{0.02}OCl$·½ $RbLaF_2Cl_2$
½ $Yb_{0.98}Er_{0.02}OCl$·½ $CsLaF_2Cl_2$
½ $Yb_{0.98}Er_{0.02}OCl$·½ $LiGdF_4$
½ $Yb_{0.98}Er_{0.02}OCl$·½ $LiGdF_2Cl_2$
½ $Yb_{0.98}Er_{0.02}OCl$·½ $NaGdF_2Cl_2$
½ $Yb_{0.98}Er_{0.02}OCl$·½ $KGdF_2Cl_2$

½ $Yb_{0.98}Er_{0.02}OCl$·½ $RbGdF_2Cl_2$
½ $Yb_{0.98}Er_{0.02}OCl$·½ $CsGdF_2Cl_2$
½ $Yb_{0.98}Er_{0.02}OCl$·½ $LiBiF_4$
½ $Yb_{0.98}Er_{0.02}OCl$·½ $LiBiF_2Cl_2$
½ $Yb_{0.98}Er_{0.02}OCl$·½ $NaBiF_2Cl_2$
½ $Yb_{0.98}Er_{0.02}OCl$·½ $KBiF_2Cl_2$
½ $Yb_{0.98}Er_{0.02}OCl$·½ $RbBiF_2Cl_2$
½ $Yb_{0.98}Er_{0.02}OCl$·½ $CsBiF_2Cl_2$
½ $Yb_{0.979}Er_{0.02}Ho_{0.001}OCl$·½ $NaYF_2Cl_2$
½ $Yb_{0.979}Er_{0.02}Ho_{0.001}OCl$.½ $TlYF_2Cl_2$
½ $Yb_{0.979}Er_{0.02}Ho_{0.001}OCl$·½ $LiYF_4$
½ $Yb_{0.979}Er_{0.02}Ho_{0.001}OCl$·½ $NaY_{0.7}Yb_{0.29}Er_{0.01}F_2Cl_2$
½ $Yb_{0.98}Er_{0.02}OCl$·½ $NaY_{0.7}Yb_{0.29}Er_{0.01}F_2Cl_2$
½ $Yb_{0.979}Er_{0.02}Ho_{0.001}OCl$·½ $NaLaF_2Cl_2$
½ $Yb_{0.979}Er_{0.02}Ho_{0.001}OCl$·½ $TlLaF_2Cl_2$
½ $Yb_{0.979}Er_{0.02}Ho_{0.001}OCl$·½ $LiLaF_4$
½ $Yb_{0.979}Er_{0.02}Ho_{0.001}OCl$ · ½ $NaLa_{0.7}Yb_{0.29}Er_{0.01}F_2Cl_2$
½ $Yb_{0.979}Er_{0.02}Ho_{0.001}OCl$·½ $NaGdF_2Cl_2$
½ $Yb_{0.979}Er_{0.02}Ho_{0.001}OCl$·½ $TlGdF_2Cl_2$
½ $Yb_{0.979}Er_{0.02}Ho_{0.001}OCl$ · ½ $LiGdF_4$
½ $Yb_{0.979}Er_{0.02}Ho_{0.001}OCl$·½ $NaGd_{0.7}Yb_{0.29}Er_{0.01}F_2Cl_2$
½ $Yb_{0.98}Er_{0.02}OCl$·½ $NaY_{0.7}Yb_{0.29}Er_{0.01}F_2Cl_2$
½ $Yb_{0.98}Er_{0.02}OCl$·½ $LiY_{0.7}Yb_{0.29}Er_{0.01}F_2Cl_2$
½ $Yb_{0.98}Er_{0.02}OCl$ · ½ $KY_{0.7}Yb_{0.29}Er_{0.01}F_2Cl_2$
½ $Yb_{0.98}Er_{0.02}OCl$·½ $CsY_{0.7}Yb_{0.29}Er_{0.01}F_2Cl_2$
½ $Yb_{0.98}Er_{0.02}OCl$·½ $NaY_{0.7}Yb_{0.29}Er_{0.01}F_2Cl_2$ + ¼ PbFcl
¾ $Yb_{0.979}Er_{0.02}OCl$·OCl ¼ $PbFCl$
½ $Yb_{0.99}Er_{0.01}OCl$·¼ $PbFCl$·¼ $NaYF_2Cl_2$
⅓ $Yb_{0.99}Er_{0.01}OBr$·⅓ $PbFBr$·⅓ $NaYf_2Br_2$
⅓ $Yb_{0.99}Er_{0.01}OCl$·⅓ $PbFBr$·⅓ $NaYF_2Br_2$
½$Yb_{0.979}Er_{0.02}Ho_{0.001}OCl$·¼ $BaFCl$·¼ $KGdF_2Cl_2$
½ $Yb_{0.98}Er_{0.02}OCl$·¼ $PbFCl$·¼ $NaYb_{0.5}Y_{0.48}Er_{0.02}F_2Cl_2$
particulate mixtures
½$(Y_{0.7}Yb_{0.29}Er_{0.01})_3OCl_7$ and ½$Li(Y_{0.7}Yb_{0.29}Er_{0.01})F_2Cl_2$
½$(Y_{0.7}Yb_{0.29}Er_{0.01})_3OCl_7$ and ½$Na\ 0.7Yb_{0.29}Er_{0.01})F_2Cl_2$
½$(Y_{0.7}Yb_{0.29}Er_{0.01})_3OCl_7$ and ½$K(Y_{0.7}Yb_{0.29}Er_{0.01})F_2Cl_2$
½$(Y_{0.7}Yb_{0.29}Er_{0.01})_3OCl_7$ and ½$Cs(Y_{0.7}Yb_{0.29}Er_{0.01})F_2Cl_2$
½$(Y_{0.5}Yb_{0.49}Er_{0.01})OCl$ and ½$Li(Y_{0.7}Yb_{0.29}Er_{0.01})F_2Cl_2$
½$(Y_{0.5}Yb_{.49}Er_{0.01})OCl$ and ½$Na(Y_{0.7}Yb_{0.29}Er_{0.01})F_2Cl_2$
½$(Y_{0.5}Yb_{.49}Er_{0.01})OCl$ and ½$K(Y_{0.7}Yb_{0.29}Er_{0.01})F_2Cl_2$
½$(Y_{0.5}Yb_{.49}Er_{0.01})OCl$ and ½$Cs(Y_{0.7}Yb_{0.29}Er_{0.01})F_2Cl_2$
½$(Y_{0.5}Yb_{.49}Er_{0.01})OCl$ and ½$BaYb_{0.97}Er_{0.03}F_5$
½ $Yb_{0.99}Er_{0.01}OCl$ and ½ $BaYb_{0.97}Er_{0.03}F_5$
½ $Yb_{0.99}Er_{0.01}OBr$ and ½ $BaYb_{0.97}Er_{0.03}F_5$
½ $Yb_{0.99}Er_{0.01}OI$ and ½ $BaYb_{0.97}Er_{0.03}F_5$ The inventive concept is of immediate value for use in coated GaAs diodes along with such means as to provide adhesion, minimize scattering and protect from the environment and such embodiment is preferred. Nevertheless, this is believed to be the first phosphor system from which a variety of apparent visible colors may be expediently produced by up conversion from infrared energy. It is apparent that such infrared energy may take other form. It may, for example, be a coherent light source, such as a solid-state laser, and such source may be frequency or amplitude modulated by means of an ancillary nonlinear element. This ancillary element may, for example, be a magneto-optic or an electro-optic modulator, a second harmonic generator; or it may be a parametric oscillator. Reasonably narrow band infrared energy may be produced by other means as from a monochrometer and broader band energy may also serve as a useful pump particularly by virtue of the broad crystal splitting of the $Yb^{3+}$ absorption levels.

Since the inventive concept is dependent upon the apparent change in color output of the phosphor, devices in accordance with the invention necessarily include means for changing the infrared power level incident on the phosphor. While this generally takes the form of a current-varying or a voltage-varying element, such is not required. Infrared power level may also be changed by means of filters, rotating polarizers, prisms and the like.

What is claimed is:

1. Device for producing emission in the visible spectrum consisting essentially of a phosphor composition comprising a crystalline composition containing the cation pair $Yb^{3+}$-$Er^{3+}$ together with first means for illuminating said phosphor with infrared radiation within the absorption spectrum for $Yb^{3+}$ characterized in that said composition has at least two anion sites per unit cell which sites are differently populated in at least 1 percent of the unit cells of said phosphor—in that at least 5 cation percent of said phosphor is $Yb^{3+}$ and that the phosphor contains at least one cation in the minimum cation percent selected from the group which consists of 1/16 percent or and 1/50 percent Ho in which said composition is capable of converting said infrared radiation to visible emission by at least two energy processes each producing a different emission wavelength, each of which invoves a multiphoton process which is at least a second-photon process, and in which second means is provided for varying the power level of said first means to vary the intensity of the infrared radiation so as to alter the relative amounts of visible emission produced by the said two processes, and in which the phosphor consists essentially of a composition selected from the group consisting of at least one compound selected from the group approximately represented as consisting of oxyhalides in which the halogen to oxygen ratio is greater than 1.5 and ROX mixed crystals and physical mixtures;

the said mixed crystals being represented as consisting of ROX together with at least one compound selected from the group consisting essentially of $M^{1+}RX_4$ and $M^{2+}X^2$, the said physical mixture consisting essentially of a first component selected from the said compound, the compound ROX, and the said mixed crystal, and a second component consisting essentially of a phosphorescent material which converts infrared radiation predominantly to visible radiation at a green wavelength independent of power level;

in which $M^{1+}$ is at least one of the monovalent ions of at least one element selected from the group consisting of Li, Na, K, Rb, Cs and Tl, $M^{2+}$ is at least one of the divalent ions of an element selected from the group consisting of Pb, Ca Sr, Ba, Cd, mg. and Zn, and in which the total R content is defined as consisting of the trivalent ion of Yb in a minimum amount of 5 cation percent of the total cations in the said phosphor composition and the trivalent ion of or in a minimum amount of 1/16 cation percent of the total cations in the said phosphor composition and from 0 to 5 cation percent on the same basis of the trivalent ion of Ho, but a minimum of 1/16 cation percent Ho is included in the said compound ROX and remainder at least one diluent selected from the trivalent ions of the elements consisting of Bi, Y, Lu, Gd, Sc and La, and X is at least one ion of an element selected from the group consisting of F, Cl, Br and I; said first means being a GaAs diode having said phosphor composition in contact therewith.

2. Device of claim 2 in which the diode is silicon doped.

3. Device of claim 1 in which the said minimum contents as set forth are 10 percent Yb and ¼ percent or 4. Device of claim 1 in which the said phosphor composition consists essentially of at least two different compounds each containing a cation grouping selected from the groupings consisting of $Yb^{3+}$–$Er^{3+}$, $Yb^{3+}$–$Ho^{3+}$, and $Yb^{3+}$–$Er^{3+}$–$Ho^{3+}$.

5. Device of claim 4 in which the phosphor consists essentially of an oxychloride with a chlorine to oxygen ratio of at least 1.5.

6. Device of claim 5 in which both $Er^{3+}$ and $Ho^{3+}$ are present.

7. Device of claim 4 in which the phosphor consists essentially of ROCl with both $Er^{3+}$ and $Ho^{3+}$ present.

8. Device of claim 4 in which the phosphor consists essentially of ROCl together with $M^{2+}$ FCl.

9. Device of claim 4 in which the phosphor consists essentially of ROCl together with $M^{1+}RF_2Cl_2$.

* * * * *

UNITED STATES PATENT OFFICE
CERTIFICATE OF CORRECTION

Patent No. 3,621,340 Dated November 16, 1971

Inventor(s) Shobha Singh, LeGrand G. VanUitert

It is certified that error appears in the above-identified patent and that said Letters Patent are hereby corrected as shown below:

Column 1, line 64, "or" should read --Er--. Column 2, line 50, "(cm. '7E'1)" should read --($cm^{-1}$)--; lines 60 and 61, "cm. '7E'1" should read --$cm^{-1}$--; and line 66, "cm. '7E'1" should read --$cm^{-1}$--. Column 3, line 21, "cm. '7E'1" should read --$cm^{-1}$--; lines 33 and 44, "or" should read --Er--; lines 57 and 60, "cm. '7E'1" should read --$cm^{-1}$--; line 68, "or" should read --Er--; and line 72, "cm. '7E'1" should read --$cm^{-1}$--. Column 4, line 49, "those" should read --THOS--. Column 5, line 22, "minimal" should read --minima--; line 61, "or" should read --Er--; and line 71, before "e.g." should be inserted --(--. Column 6, line 12, "$Yb_{0.20.01}$" should read --$Yb_{.2}Er$--; and lines 72 and 73, "or" should read --Er--. Column 7, line 30, "$(Yb_{0.3}Ho_{0.0050.695})OCl$" should read --$(Yb_{0.3}Ho_{0.005}Y_{0.695})OCl$--. Column 8, line 17, "$1/2...1/2^{NaLa}...$" should read --1/2...1/2 NaLa...--; line 20, "$1/2...1/2^{LiGdF_4}$" should read --$1/2...1/2\ LiGdF_4$--; line 24, "$1/2^{KY}{}_{0.7}$" should read --$1/2KY_{0.7}$--; line 27, "$3/4Yb_{0.979}Er_{0.02}OCl.OCl\ 1/4^{PbFCl}$" should read --$3/4Yb_{0.979}Er_{.02}Ho_{.001}OCl\cdot 1/4PbFCl$--; and line 36, "1/2...1/2Na 0.7..." should read --$1/2...1/2Na(Y_{0.7}Yb_{0.29}...$--. Column 9, line 10, "or" should read --Er--; and line 26, "$M^{2+}X^{2}$" should read --$M^{2+}X_2$--. Column 10, line 2, "mg" should read --Mg--; and lines 6 and 19, "or" should read --Er--.

Signed and sealed this 27th day of June 1972.

(SEAL)
Attest:

EDWARD M.FLETCHER,JR.
Attesting Officer

ROBERT GOTTSCHALK
Commissioner of Patents

RM PO-1050 (10-69)
USCOMM-DC 60376-P69
☆ U.S. GOVERNMENT PRINTING OFFICE : 1969 O—366-334